Patented Aug. 25, 1942

2,293,848

UNITED STATES PATENT OFFICE 2,293,848

COCONUT PRODUCT AND PROCESS FOR MAKING SAME

Thomas M. Rector, Morristown, N. J., assignor to General Foods Corporation, New York, N. Y., a corporation of Delaware No Drawing. Application August 26, 1939, Serial No. 292,139

6 Claims. (Cl. 99—125)

This invention relates to a plastic coconut product and to a method of producing the same.

When coconut meat is finely ground, the cells are broken up into small particles of fibrous matter and their fat content is released. If the temperature is above the melting point of the fat (approximately 76° F.), and provided that the moisture content is not so high as to cause the formation of an oil-in-water emulsion, a liquid is obtained in which small particles of solid fibrous matter are suspended in the liquid fat. This product is filled in liquid form into containers in which it solidifies on cooling, and is sold and used as a shortening in bakery goods, a filling in candies and confectionery, etc.

It has been found, however, that such a product has a number of distinct disadvantages. The non-fatty material has a specific gravity of about 1.4 as compared with about .91 for the fatty material, so that when the liquid is filled into the containers the heavier non-fatty material settles out before solidification, producing a heavy pasty mass at the bottom of the container and a cloudy oil at the top. Moreover, on solidification the oil crystallizes in relatively large crystals and becomes hard and brittle and difficult to remove from the container. Such sedimentation of the fibrous matter and crystallization of the fat necessitates melting and thoroughly stirring the entire contents of the container each time it is desired to use a portion thereof, so that the product is not adapted for general use.

It is an object of the present invention to provide a coconut preparation in which the particles of fibrous matter remain suspended in the fat and do not settle out on standing.

Another object of the invention is to provide a coconut preparation in which the particles of solid matter remain uniformly dispersed throughout at temperatures above the normal melting point of the coconut fat.

A further object is to provide a coconut product which remains plastic at temperatures both substantially below and substantially above the normal melting point of coconut fat.

Broadly stated, the accomplishment of the foregoing objects involves a modification of the dispersed system of the liquid product resulting from the comminution of coconut meat in such a way as to effect an increase in viscosity of the entire mass. The viscosity may be increased by suitably increasing the displacement of the dispersed system as for example by the addition of uniformly dispersed crystals of higher melting point fats, uniformly dispersed bubbles of air or other suitable gas, or both.

The following is a description of a suitable procedure for practicing the process generally described above. The coconut meat, preferably first dried to a moisture content of 5% or less, is reduced to a finely divided state by grinding in any suitable apparatus capable of disrupting substantially all of the fat cells and reducing the fibrous material to small particles. For example, the meat may be dried to a moisture content of less than 3% to facilitate grinding and the solid particles after grinding may be of the order of 150 microns or less in size. As a consequence of the heat produced by grinding, the mass is in the condition of a free-flowing liquid which may be pumped to suitable filtering apparatus wherein any particles exceeding the desired degree of fineness may be separated and returned to the grinding apparatus.

From the filter the liquid is then passed to a suitable chilling apparatus in which the temperature of the liquid is rapidly reduced enough to cause the higher melting point glycerides present in the fatty material to solidify in the form of uniformly dispersed fine crystals, but without completely solidifying the mass. Any suitable apparatus may be used for this purpose, a simple and practical machine comprising merely a refrigerated drum with the surface of which the liquid material is brought in contact and from which any solidified material is removed by suitable scrapers. The temperature of the chilling drum or roll should be low enough to produce the desired sudden chilling and crystallization. For example, it may be maintained at a temperature of 0° F. or less by any suitable refrigerant such as ammonia.

The partially cooled but still semi-liquid or pasty product is then treated in any suitable manner to incorporate in the mass a multitude of small bubbles of air or other suitable inert gas, as for example by beating or whipping in any suitable device. Preferably the amount of air or other gas is from 5 to 15% by volume of the whole mass.

The pasty mass resulting from the above treatment is then packed in shipping containers and allowed to cool, or cooled in the form of bricks, etc., for storage and shipment. At temperatures of 70° F. and below this product is a solid homogeneous mass in a pasty plastic state, the degree of plasticity varying somewhat with the temperature. The solid portion of the mass, exclusive of air or gas bubbles, consists of approximately 66% coconut fat or oil into which approximately 34% of finely divided non-fatty coconut solids are uniformly dispersed. Hence this product can be used directly from the container, either as measured portions or as a whole, without prior melting and stirring that has been necessary with previous products of this type.

Furthermore the new product is capable of withstanding temperatures well above the normal 76° F. melting point of coconut oil while still retaining its soft pasty condition. Under test a product prepared as described above has demonstrated that it will remain in plastic homogeneous condition, without separation of the solid matter, sedimentation or stratification, etc., although continuously exposed to temperatures as high as 85° F. for as long as three days, which is sufficient for the usual conditions encountered in practice. Hence for practical purposes a coconut preparation embodying the present invention is at all times a plastic homogeneous product which is free from the above mentioned disadvantages of prior products of this kind and which provides a uniform, conveniently handled and entirely practical product for the baker, confectioner, etc.

It will be understood that the process specifically described above is for purposes of example only and that the invention is not limited thereto, as various changes which will be apparent to those skilled in the art can be made in the detail of procedure without departing from the spirit of the invention. Reference should therefore be had to the appended claims for a definition of the limits of the invention.

What is claimed is:

1. A coconut product which maintains a pasty or plastic homogeneous condition at temperatures substantially above as well as below the melting point of coconut oil and comprising coconut oil and fat containing a uniformly dispersed suspension, the dispersed system consisting of finely divided solid particles of the fibrous matter of the coconut meat, small crystals of relatively high melting point fats, and small bubbles of an inert gas.

2. A plastic coconut product comprising the fats and oils of coconut meat containing small solid particles of the fibrous matter of the coconut meat of the order of 150 microns or less in size and small bubbles of an inert gas forming about 5 to 15% by volume of the product, said particles and bubbles being dispersed throughout the product to provide uniform and homogeneous consistency and to prevent separation and settling of the solid particles at temperatures substantially above as well as below the melting point of coconut oil.

3. A process for preparing a plastic coconut product which comprises comminuting coconut meat, thereby forming a liquid suspension of finely divided solid particles of the fibrous matter of the coconut meat dispersed in the coconut fats and oils, and then increasing the viscosity of the suspension to form and maintain a pasty or plastic mass at temperatures substantially above as well as below the melting point of coconut oil by chilling to cause the formation of small crystals of relatively high melting point fats and by incorporating small bubbles of an inert gas throughout the mass.

4. A process for preparing a plastic coconut product which comprises comminuting coconut meat to release the coconut fats and oils from the cells and reduce the cell walls to solid particles of the order of 150 microns or less in size suspended in said fats and oils, and then increasing the viscosity of said suspension to provide and maintain a pasty or plastic mass at temperatures substantially above as well as below the melting point of coconut oil by chilling the liquid and then incorporating about 5 to 15% by volume of an inert gas dispersed throughout the product in small bubbles.

5. A coconut product prepared from whole coconut meat and comprising a plastic homogeneous suspension consisting of the fats and oils of the coconut meat with the fibrous matter of the coconut meat suspended therein in the form of finely divided solid particles and with small bubbles of an inert gas substantially uniformly dispersed therein whereby separation and settling of the solid particles is prevented and the homogeneous condition of said product is maintained at temperatures substantially above as well as below the melting point of coconut oil.

6. A process for preparing a plastic coconut product which comprises comminuting whole coconut meat to form a suspension of finely divided solid particles of the fibrous matter of the coconut meat in the fats and oils of the coconut meat and then increasing the viscosity of the suspension to prevent separation of the solid particles and to maintain a plastic homogeneous consistency at temperatures substantially above as well as below the melting point of coconut oil by incorporating small bubbles of an inert gas throughout the mass of the suspension.

THOMAS M. RECTOR.